(12) United States Patent
Tatehata et al.

(10) Patent No.: US 8,378,992 B2
(45) Date of Patent: *Feb. 19, 2013

(54) TOUCH PANEL, AND MOVABLE CONTACT UNIT AND SWITCH USING THE SAME TOUCH PANEL

(75) Inventors: Naoki Tatehata, Kyoto (JP); Yousuke Chikahisa, Hyogo (JP); Koji Tanabe, Osaka (JP)

(73) Assignee: Panasonic Corporation, Osaka (JP)

( * ) Notice: Subject to any disclaimer, the term of this patent is extended or adjusted under 35 U.S.C. 154(b) by 561 days.

This patent is subject to a terminal disclaimer.

(21) Appl. No.: 12/352,791

(22) Filed: Jan. 13, 2009

(65) Prior Publication Data

US 2009/0179871 A1 Jul. 16, 2009

(30) Foreign Application Priority Data

Jan. 15, 2008 (JP) .................................. 2008-005347

(51) Int. Cl.
*G06F 3/045* (2006.01)

(52) U.S. Cl. ........................................ 345/174; 345/173

(58) Field of Classification Search ........................ None
See application file for complete search history.

(56) References Cited

U.S. PATENT DOCUMENTS

| | | | |
|---|---|---|---|
| 7,528,903 B2 | 5/2009 | Uchida | |
| 7,635,819 B2 | 12/2009 | Lee et al. | |
| 7,683,279 B2 | 3/2010 | Kim | |
| 7,710,406 B2 | 5/2010 | Fujii et al. | |
| 7,932,898 B2 * | 4/2011 | Philipp et al. | 345/174 |
| 8,212,787 B2 * | 7/2012 | Tatehata et al. | 345/173 |
| 2004/0119701 A1 * | 6/2004 | Mulligan et al. | 345/173 |
| 2007/0062739 A1 * | 3/2007 | Philipp et al. | 178/18.06 |
| 2007/0063876 A1 * | 3/2007 | Wong | 341/34 |
| 2007/0132737 A1 | 6/2007 | Mulligan et al. | |
| 2007/0202618 A1 * | 8/2007 | Ohno et al. | 438/22 |
| 2007/0262962 A1 * | 11/2007 | XiaoPing et al. | 345/173 |
| 2008/0198625 A1 * | 8/2008 | Inoue | 362/617 |

FOREIGN PATENT DOCUMENTS

| | | |
|---|---|---|
| CN | 1616454 | 5/2005 |
| CN | 101017417 | 8/2007 |
| JP | 2007-141269 | 6/2007 |
| WO | WO 2007100180 A1 * | 9/2007 |

* cited by examiner

*Primary Examiner* — Lixi C Simpson
(74) *Attorney, Agent, or Firm* — Wenderoth, Lind & Ponack, L.L.P.

(57) ABSTRACT

A touch panel includes multiple belt-like lower electrodes formed on a light transparent base sheet and multiple belt-like upper electrodes placed away from the lower electrodes with a predetermined distance therebetween and in a direction crossing with the lower electrodes at right angles. The lower and upper electrodes are made of light transmissive and electrically conductive resin, so that they can be formed in a simple way such as printing. The foregoing structure thus allows obtaining the touch panel manufactured in a simple way at a lower cost.

9 Claims, 7 Drawing Sheets

TOUCH PANEL, AND MOVABLE CONTACT UNIT AND SWITCH USING THE SAME TOUCH PANEL

FIELD OF THE INVENTION

The present invention relates to capacitive sensor touch panels to be used for operating a variety of electronic devices, and movable contact units as well as switches using the same touch panels.

BACKGROUND OF THE INVENTION

In recent years, a variety of electronic devices including portable terminal devices, such as cell phones among others, have increasingly employed light emitting diodes (LED) or electroluminescence (EL) elements for illuminating their operating sections because these components allow the users to identify and operate push buttons or display sheets with ease in a dark environment. Touch panels and switches to be used in these devices thus need to be reliably operable and inexpensive.

A conventional touch panel and a switch are described hereinafter with reference to FIGS. 10 and 11. FIG. 10 shows a sectional view of the conventional switch, and its dimensions are enlarged thickness-wise for illustrating the structure more understandable. FIG. 11 shows an exploded perspective view of a conventional touch panel.

As shown in FIGS. 10 and 11, multiple lower electrodes 2 are arranged at predetermined intervals on a top face of film-like lower base sheet 1 of light transparency. Lower electrode 2 is belt-like and light transmissive, and made from indium tin oxide and the like. Multiple upper electrodes 4 are film-like and light transmissive, and arranged at predetermined intervals on film-like and light transparent upper base sheet 3 in a direction crossing with lower electrodes 2 at right angles. Upper electrode 4 is belt-like and light transmissive, and made from indium tin oxide and the like.

Upper base sheet 3 is layered on the top face of lower base sheet 1, and film-like light transparent protective sheet 5 is layered on the top face of upper base sheet 3. These sheets are bonded to each other with adhesive (not shown), so that touch panel 6 shown in FIG. 10 is constructed.

Multiple push-switches 8 are mounted on top face 7a of wired board 7, and upper end 8b of operating shaft 8a of switch 8 solidly touches underside 6a of touch panel 6. Multiple wiring patterns (not shown) are formed on top face 7a and underside 7b of wired board 7. Push switch 8 moves vertically its shaft 8a protruding upward for carrying out an electric contact.

Multiple light emitting elements 9, such as LEDs, are mounted on top face 7a of wired board 7, and they are placed between respective push switches 8 with their light emitting faces looking upward.

Light transparent and film-like display sheet 10 forms multiple display sections 10b at its underside. Light proof section 10a formed on the underside of sheet 10 by printing is punched to shape a letter or a symbol, thereby forming each one of display sections 10b. The switch is formed of display sheet 10 having display sections 10b placed above push switch 8, and wired board 7 including push switches 8 and light emitting elements 9 at its top face 7a, and touch panel 6.

Touch panel 6 to be used in the switch discussed above is generally manufactured through the following processes: First, lower base sheet 1 and upper base sheet 3, on which respective entire top faces conductive layers made from indium tin oxide and the like are formed, are covered with synthetic resin and the like at the places where lower electrodes 2 and upper electrodes 4 are to be formed, thereby providing each one of the foregoing places with a masking film. Then base sheets 1 and 3 are dipped into a predetermined solution for undergoing an etching process. Conductive layers except the masked places are melted and removed through the etching process before the masking film is peeled off. Base sheets 1 and 3 are then washed. Lower base sheet 1 having multiple lower electrodes 2 arranged at predetermined intervals on its top face is thus completed, and upper base sheet 3 having multiple upper electrodes 4 arranged at predetermined intervals at its top face and in the direction crossing lower electrodes 2 at right angles is also completed. Finally upper base sheet 3 is layered on the top face of lower base sheet 1, and protective sheet 5 is layered on the top face of upper base sheet 3, and these sheets are bonded together by adhesive, thereby completing touch panel 6.

The switch thus formed is mounted to an operating board of an electric device, and lower electrodes 2 as well as upper electrodes 4, multiple push switches 8, and light emitting elements 9 are coupled via wiring patterns or lead wires (not shown) to an electronic circuit (not shown) of the device.

The electronic circuit applies a voltage to multiple lower electrodes 2 and upper electrodes 4 sequentially, and a user lightly touches his/her finger to the top face of display sheet 10 for operating the device. Parts of electric charges of touch panel 6 travel to the finger, so that a capacitance between lower electrode 2 and upper electrode 4 touched with the finger changes, and then the electronic circuit can detect which part of display sheet 10 is touched and operated.

When display section 10b is pressed downward at a predetermined place, display sheet 10 and touch panel 6 are bowed downward, which depresses shaft 8a, and push-switch 8 carries out an electric contact. The electronic circuit thus detects which part of display section 10b is pressed for operating the device.

In response to the foregoing touch or press to touch panel 6, a variety of functions of the device is switched over, and the electronic circuit of the device supplies power to light emitting elements 9. Then multiple light emitting elements 9 emit light, and the light travels through touch panel 6 and illuminates multiple display sections 10b from below. This illumination from below allows the user to read a letter or a symbol on display section 10b even when the environment is dark, so that the user can operate the device with ease.

A change in capacitance of touch panel 6 prompts the electronic circuit to detect which part of display sheet 10 is touched and pressed with electric conduction through push switch 8. At the same time, multiple light emitting elements 9 emit light, so that multiple display sections 10b of display sheet 10 can be illuminated for the user to operate the device with ease.

Unexamined Japanese Patent Application Publication No. 2007-141269 is known as related art to the present invention.

Touch panel 6 and the switch using the same touch panel discussed above need a time consuming process for manufacturing base sheets 1 and 3, namely, base sheets 1 and 3 with multiple light-transmissive lower and upper electrodes 2 and 4 formed thereon are dipped in the solution for undergoing the etching process. This time consuming process inevitably increases the cost of the base sheets.

SUMMARY OF THE INVENTION

The present invention addresses the problem discussed above, and aims to provide an inexpensive touch panel assuring reliable operation, and a movable contact unit as well as a switch using the same touch panel.

The touch panel of the present invention includes the following elements:
multiple belt-like lower electrodes formed on a top face of a light transparent base sheet; and
multiple belt-like upper electrodes formed in a direction crossing with the lower electrodes at right angles and spaced apart from the lower electrodes with a predetermined distance,
where both of the electrodes are made of light transmissive and electrically conductive resin.

The foregoing structure allows forming the lower and upper electrodes simply by a printing method because the electrodes are made of conductive resin. As a result, a touch panel simply manufactured at a lower cost is obtainable.

The movable contact unit of the present invention includes the following elements:
the foregoing touch panel; and
a domed movable contact made of conductive metal thin sheet and mounted on the underside of the touch panel.

The foregoing structure allows employing the touch panel manufactured simply at a lower cost, so that the movable contact unit assuring reliable operation and manufactured at a lower cost is obtainable.

The switch of the present invention includes the following elements:
the foregoing touch panel; and
multiple switch contacts and light emitting bodies provided to the underside of the touch panel.

The foregoing structure allows employing the touch panel manufactured simply at a lower cost, so that the switch assuring reliable operation and manufactured at a lower cost is obtainable.

The present invention as discussed above can advantageously achieve the touch panel manufactured at a lower cost and assuring reliable operation, and also achieve the movable contact unit as well as the switch employing this touch panel and assuring reliable operation at a lower cost.

DETAILED DESCRIPTION OF THE INVENTION

Exemplary embodiments of the present invention are demonstrated hereinafter with reference to FIG. 1-FIG. 9. Sectional views of these drawings are enlarged their dimensions thickness-wise for better understanding of the structure. Similar elements in the respective drawings have the same reference marks, and the descriptions thereof are sometimes omitted.

Embodiment 1

Figure 1:
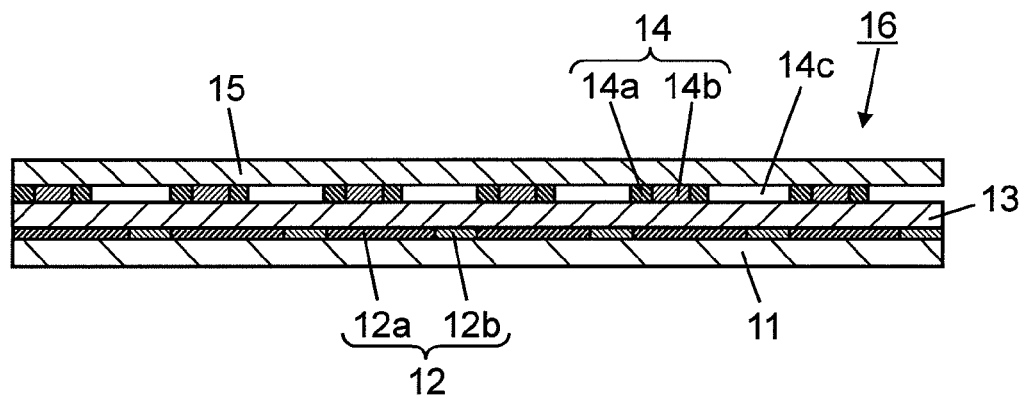
FIG. 1 shows a sectional view of a touch panel in accordance with a first embodiment of the present invention.
Figure 2:
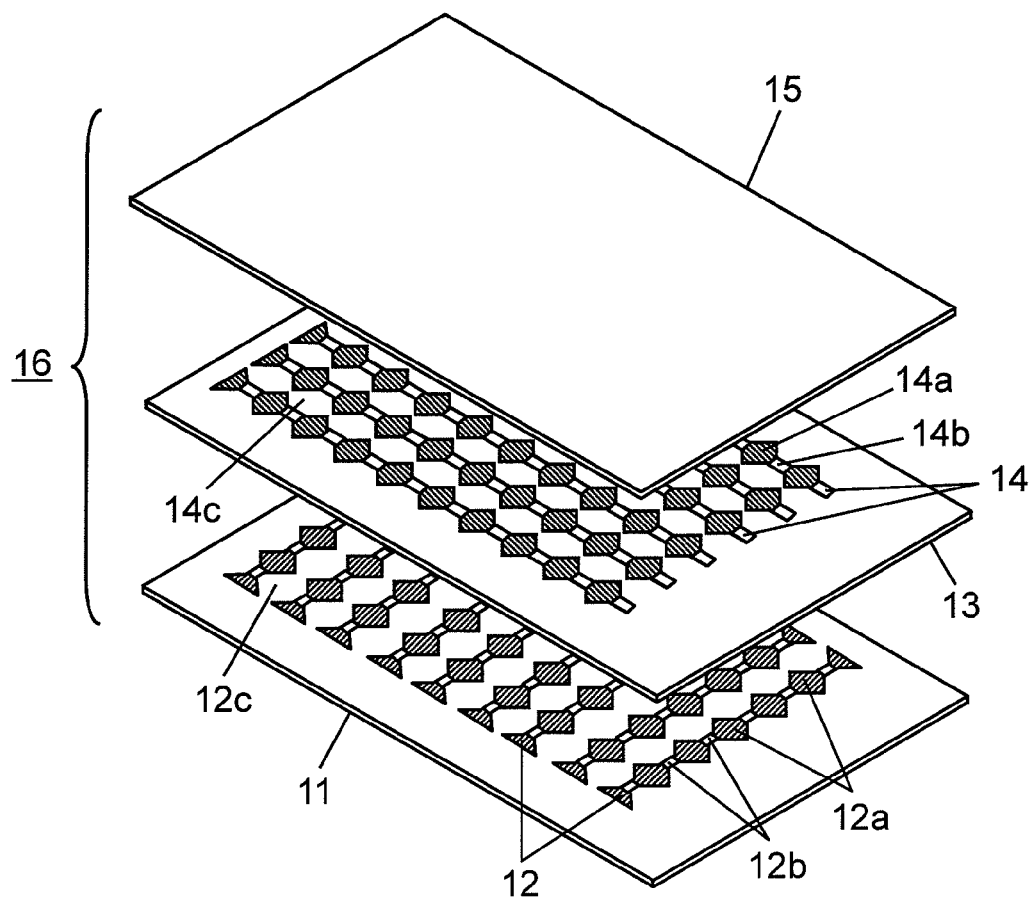
FIG. 2 shows an exploded perspective view of the touch panel in accordance with the first embodiment of the present invention.

FIG. 1 shows a sectional view of a touch panel in accordance with the first embodiment of the present invention. FIG. 2 shows an exploded perspective view of the same touch panel. In FIGS. 1 and 2, the touch panel of the present invention includes the following elements:
light transparent base sheet 11;
multiple belt-like lower electrodes 12 placed on a top face of base sheet 11; and
multiple belt-like upper electrodes 14 spaced away from lower electrodes 12 with a predetermined distance and placed in a direction crossing with lower electrodes 12 at right angles.

Both of lower and upper electrodes 12 and 14 are formed of light transmissive and electrically conductive resin. Base sheet 11 is used as lower base sheet 11, and upper base sheet 13 is placed between lower electrodes 12 and upper electrodes 14. Lower base sheet 11 is film-like and light transmissive, and is made from polyether-sulfone, polycarbonate, polyethylene terephthalate or the like. Each one of lower electrodes 12 shapes like a belt or generally a belt, and is light transmissive. Electrodes 12 are arranged on the top face of lower base sheet 11 at predetermined intervals.

Upper base sheet 13 is film-like and light transparent, and is made from a similar material to that of lower base sheet 11. Each one of upper electrodes 14 shapes like a belt or generally a belt, and is arranged on a top face of upper base sheet 13 at predetermined intervals in a direction crossing with lower electrodes 12 at right angles.

Figure 3A:
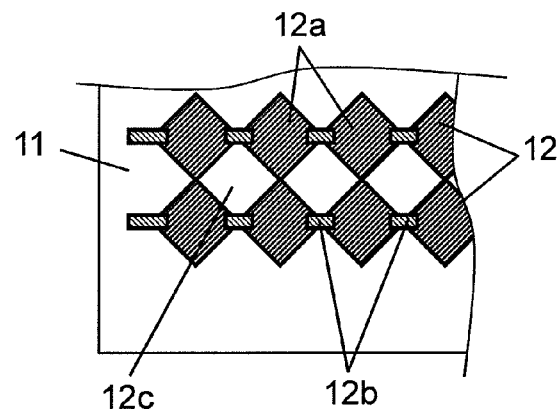
FIG. 3A shows a partial plan view of the touch panel in accordance with the first embodiment of the present invention.
Figure 3B:
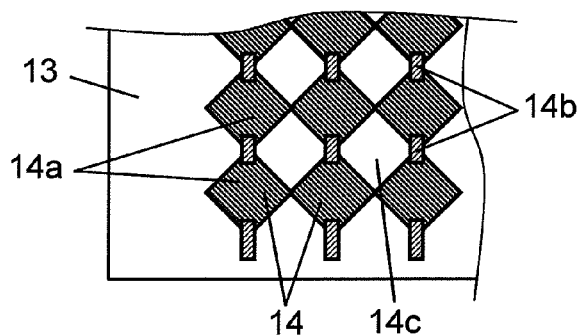
FIG. 3B shows another partial plan view of the touch panel in accordance with the first embodiment of the present invention.
Figure 3C:
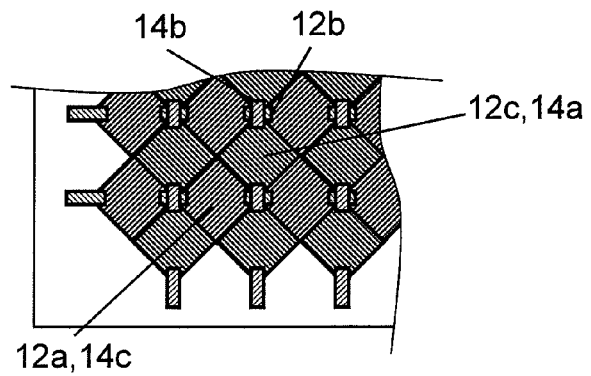
FIG. 3C shows still another partial plan view of the touch panel in accordance with the first embodiment of the present invention.

FIGS. 3A-3C show partial plan views of the touch panel in accordance with the first embodiment of the present invention. As shown in FIGS. 3A and 3C, multiple lower electrodes 12 as well as upper electrodes 14 are formed of multiple light transmissive sections 12$a$ as well as 14$a$ both shaped like a square and multiple electrically conductive sections 12$b$ as well as 14$b$ both shaped like a rectangle. Each one of conductive sections 12$b$ couples light transmissive sections 12$a$ with each other, and each one of conductive sections 14$b$ couples light transmissive sections 14$a$ with each other. Light transmissive sections 12$a$ and 14$a$ are made of electrically conductive resin, e.g. polythiophene or polyaniline, and conductive sections 12b and 14b are made of, e.g. polyester or epoxy in which silver or carbon is dispersed.

On top of that, multiple voids 12c shaped like generally a square are provided between respective lower electrodes 12, and voids 14c similar to voids 12c are provided between respective upper electrodes 14. Upper base sheet 13 is layered on lower base sheet 11 such that multiple voids 14c are layered above multiple light transmissive sections 12a respectively, and multiple light transmissive sections 14a are layered above multiple voids 12c respectively as shown in FIG. 1 and FIG. 3C. Sheet 13 and sheet 11 are bonded together by adhesive such as acrylic or rubber (not shown) so that light transmissive sections 12a confront voids 14c as well as voids 12c confront light transmissive section 14a with a predetermined distance therebetween, i.e. the thickness of upper base sheet 13.

To be more specific, an overlaid section of light transmissive section 12a and void 14c, and another overlaid section of void 12c and light transmissive section 14a allow the light to transmit through almost all their areas, while an overlaid section of conductive sections 12b and 14b looks gray or black.

Multiple lower and upper electrodes 12 and 14 discussed above can be manufactured this way: First, multiple light transmissive sections 12a and 14a are screen-printed on the respective top faces of lower base sheet 11 and upper base sheet 13 before they are dried. Then multiple conductive sections 12b and 14b are also screen-printed before they are dried. Lower and upper electrodes 12 and 14 can be thus manufactured through simple processes within a relatively short time.

Upper base sheet 13 is layered on the top face of lower base sheet 11, and film-like light transparent protective sheet 15 is layered on the top face of base sheet 13. These sheets are bonded together by adhesive (not shown), thereby completing touch panel 16.

Figure 4:
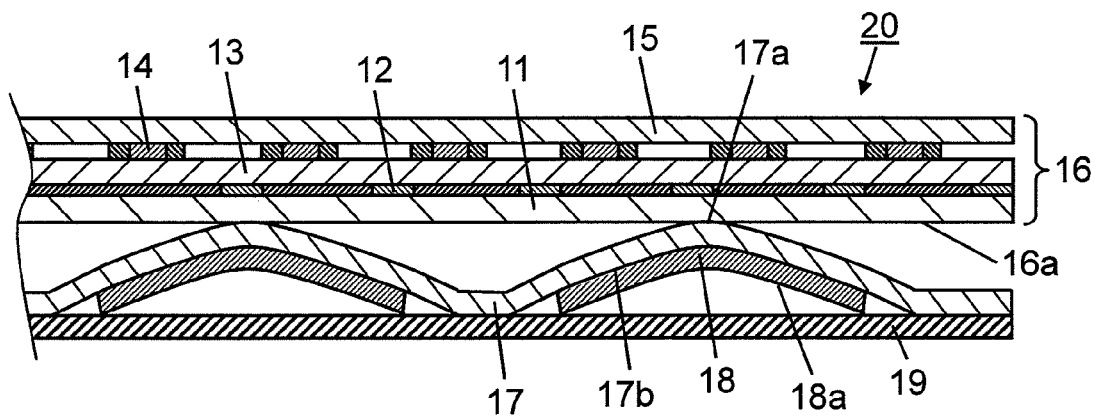
FIG. 4 shows a sectional view of a movable contact unit employing the touch panel in accordance with the first embodiment of the present invention.

FIG. 4 shows a sectional view of the movable contact unit employing touch panel 16 in accordance with the first embodiment. Film-like flexible cover sheet 17 is made of polyethylene terephthalate or polycarbonate and the like, and substantially domed movable contact 18 is made of conductive metal thin sheet such as copper alloy or steel. Cover sheet 17 is bonded to underside 16a of touch panel 16 at predetermined sections 17a of the circumference with adhesive (not shown). Multiple movable contacts 18 are bonded onto underside 17b of cover sheet 17.

Film-like separator 19 made of polyethylene-terephthalate is provided to cover the entire underside 17b of cover sheet 17. The presence of separator 19 allows preventing underside 18a of movable contact 18 from being covered with dust during storage or transportation. Movable contact unit 20 is thus constructed.

Figure 5:
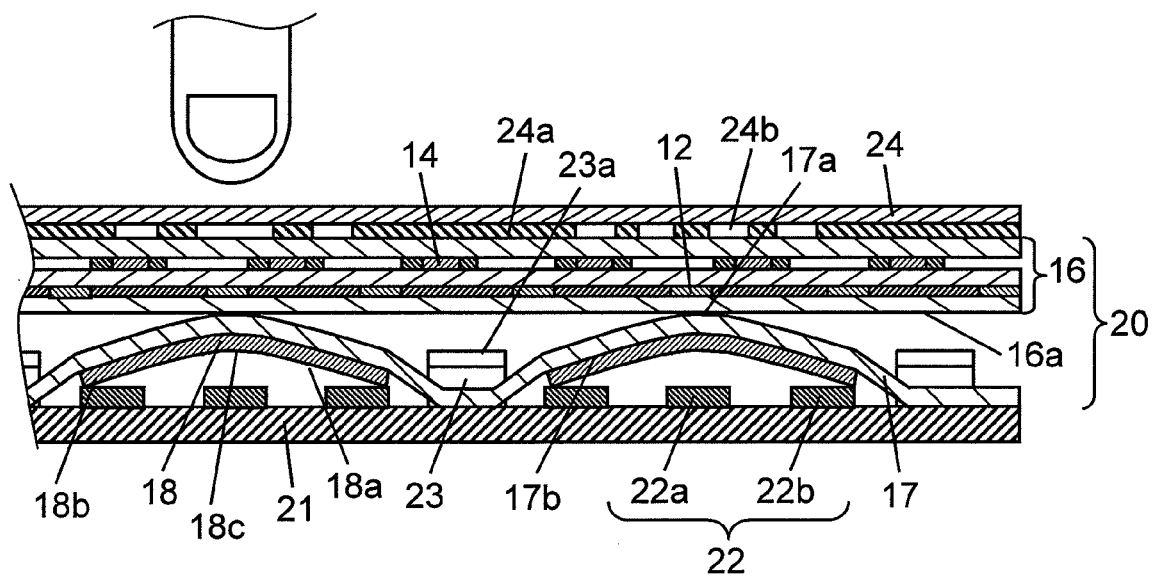
FIG. 5 shows a sectional view of a switch employing the touch panel in accordance with the first embodiment of the present invention.

FIG. 5 shows a sectional view of the switch employing the touch panel in accordance with the first embodiment. Wired board 21 includes multiple wiring patterns (not shown) drawn with copper on its top face and underside. Multiple fixed contacts 22 are provided to a top face of wired board 21. Each one of fixed contacts 22 is made of copper or carbon, and formed of substantially circular center fixed contact 22a and multiple outer fixed contact 22b surrounding center contact 22a and shaped like a horse-shoe or a ring. Wired board 21 is a film-like board and made of, e.g. polyethylene terephthalate or polycarbonate, or a board made of paper phenol or glass epoxy.

Movable contact unit 20 with separator 19 removed is placed on the top face of wired board 21, and outer rim 18b of movable contact 18 is placed on outer fixed contact 22b, and underside center 18c of movable contact 18 confronts center fixed contact 22a with a predetermined clearance. Multiple switch contacts are thus formed on underside 16a of touch panel 16.

As shown in FIG. 5, multiple light emitting elements 23 such as LEDs are mounted onto the top face of wired board 21 with their light emitting faces 23a looking upward. Light emitting elements 23 are placed between multiple movable contacts 18, so that light emitting bodies 23 are formed on underside 16a of touch panel 16.

Light transparent and film-like display sheet 24 has light proof section 24a printed on its underside, and light-proof section 24a is punched at its predetermined parts to shape letters and symbols, thereby forming multiple display sections 24b. Display sheet 24 is placed on movable contact unit 20 including touch panel 16 such that display sections 24b are placed above movable contacts 18. The switch is thus formed of display sheet 24, movable contact unit 20 with touch panel 16, and wired board 21 with multiple switch contacts and light emitting bodies 23.

The switch discussed above is mounted to an operating board of an electronic device, and lower electrodes 12 as well as upper electrodes 14 of touch panel 16, multiple fixed contacts 22, light emitting bodies 23 are coupled via the wiring patterns or lead wires (not shown) to an electronic circuit (not shown) of the electronic device.

The electronic circuit applies a voltage to multiple lower electrodes 12 and upper electrodes 14 sequentially, and a user lightly touches his/her finger to the top face of display sheet 24 for operating the device. Parts of electric charges of touch panel 16 travel to the finger, so that a capacitance of respective lower electrode 12 and upper electrode 14 touched with the finger changes, so that the electronic circuit can detect which part of display section 24 is touched and operated.

In this structure, multiple lower electrodes 12 and upper electrodes 14 are layered together such that voids 14c are overlaid above light transmissive sections 12a and light transmissive sections 14a are overlaid above voids 12c. On top of that, the change in capacitance due to a finger touch can be detected not between lower electrodes 12 and upper electrodes 14 but in respective local lower electrodes 12 and local lower electrodes 14 around the place touched and operated. This structure allows the electronic circuit to simply detect a place touched and operated.

In other words, a conventional detection of a change in capacitance between, e.g. five lower electrodes 12 and five upper electrodes 14, needs 25 times of detection, i.e. five times detection between one lower electrode 12 and respective five upper electrodes 14, and another five detections are needed to the other four lower electrodes 12, so that 25 detections in total are needed.

On the other hand, the touch panel of the present invention allows detecting a change in capacitance of lower electrodes 12 and upper electrodes 14 around the touched and operated place, where light transmissive sections 12a and 14a are alternately formed vertically as shown in FIG. 3C. The detection is repeated in total numbers of electrodes 12 and 14, namely, ten electrodes in total and thus ten times of detection, for detecting the change. The present invention thus can detect the change simpler than the conventional method with less than a half of detections.

A depression onto a predetermined display section 24b of display sheet 24 prompts touch panel 16 and cover sheet 17 to bow, which presses the center of substantially domed movable contact 18. In other words, receiving predetermined depressing force, movable contact 18 is resiliently depressed and reversed inside-out with tactile feeling, and underside center 18c of contact 18 touches center fixed contact 22a. This action allows electrically connecting center fixed contact 22a to outer fixed contact 22b via movable contact 18, so that the electronic circuit can detect which display section 24b is depressed and operated.

When the depressing force applied to display sheet 24 is lifted, movable contact 18 is reversed again and returns upward due to its own resilient restoring force. Then underside center 18c leaves center fixed contact 22a, so that center fixed contact 22a is electrically isolated from outer fixed contact 22b.

In response to the touch or depression, the device can switch a variety of functions, and allows its electronic circuit to supply power to light emitting elements 23. Then light emitting elements 23 emit light, which travels through touch panel 16 and illuminates multiple display sections 24b from below. A user can thus read the letters or symbols on display sections 24b even when the environment is dark and thus can operate the device with ease.

In other words, the electronic circuit of the device detects an operated section on display sheet 24 with a change in capacitance of touch panel 16, and the electronic circuit detects a depressed section through the contact/isolation to/from fixed contacts 22. At the same time, multiple light emitting elements 23 emit light, so that touch panel 16 illuminates multiple display sections 24b of display sheet 24.

At this time, the light emitted from light emitting elements 23 travels through touch panel 16 for illuminating display sections 24. However, as discussed above, almost all the places except the ones, where conductive sections 12b and 14b are overlaid, are formed of light transmissive sections 12a and voids 14c overlaid together as well as light transmissive sections 14a and voids 12c overlaid together. Since these sections are made of light transmissive and conductive resin, touch panel 16 hardly makes loss of the brightness of the light emitted from light emitting element 23, so that bright and excellent illumination can be expected.

Lower and upper electrodes 12 and 14 of touch panel 16 are made of electrically conductive resin, so that they need no cumbersome steps such as etching and washing, through which the conventional electrode made of metal oxide, e.g. indium tin oxide, must undergoes. Electrodes 12 and 14 thus can be formed simply by a screen-printing method.

On top of that, electrodes 12 and 14 are formed of multiple light transmissive sections 12a, 14a, and conductive sections 12b, 14b which join respective transparent sections together, so that each one of electrodes 12 and 14 has a smaller resistance, and thus steady and reliable operation can be expected.

To be more specific, electrode 12 or 14 is not entirely made of polythiophene or polianiline having a rather large sheet resistance ranging from 500Ω/□ to 1.5 kΩ/□, but a specific part of electrode 12 or 14 is made of polyester or epoxy, with silver or carbon dispersed therein, having a rather small sheet resistance ranging from 10Ω/□ to 300Ω/□. This specific part is referred to as conductive section 12b or 14b, which joins multiple light transmissive sections 12a or 14a together. In other words, conductive sections 12b and 14b, having a narrower width than light transmissive sections 12a or 14a, are made of material of small resistance. This structure allows reducing the resistance of entire electrode 12 or 14.

As discussed above, according to this first embodiment, multiple belt-like lower electrodes 12 formed on light transparent lower base sheet 11 are prepared, and multiple belt-like upper electrodes 14 are placed above electrodes 12 with a predetermined distance therefrom and in a direction crossing with electrodes 12 at right angles. Electrodes 12 and 14 are made of light transmissive and electrically conductive resin, so that both the electrodes 12 and 14 can be formed in a simple method such as printing. As a result, touch panel 16 can be manufactured at a lower cost with a simpler method.

Domed movable contact 18 made of conductive thin metal sheet is mounted onto underside 16a of foregoing touch panel 16. Multiple switch contacts formed of movable contacts 18 and fixed contacts 22 are placed below the underside 16a, and the light emitting bodies formed of multiple light emitting elements 23 are also placed below underside 16a. This structure allows achieving movable contact unit 20 and a switch, which can be manufactured at a lower cost and assure reliable operation.

Embodiment 2

Figure 6:
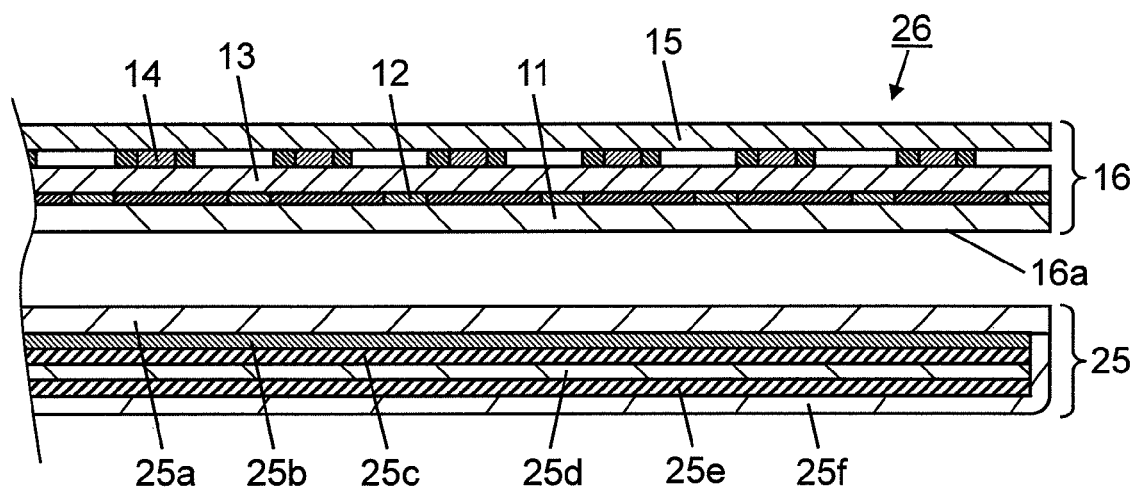
FIG. 6 shows an exploded sectional view of a movable contact unit in accordance with a second embodiment of the present invention.
Figure 6:
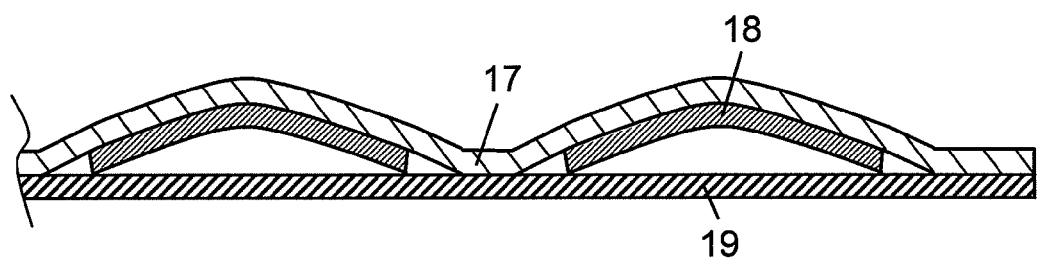

FIG. 6 shows an exploded sectional view of a movable contact unit in accordance with the second embodiment of the present invention. Belt-like and light transmissive multiple lower electrodes 12 are arranged at predetermined intervals on a top face of lower base sheet 11. Belt-like and light transmissive multiple upper electrodes 14 are arranged at predetermined intervals on a top face of upper base sheet 13. Base sheet 13 is layered on lower base sheet 11 such that upper electrodes 12 away from upper electrodes 14 with a predetermined distance and electrodes 12 cross with electrodes 14 at right angles. This structure is similar to that of the first embodiment.

Electrodes 12 and 14 are formed of multiple light transmissive sections 12a and 14a shaped like a square and made of conductive resin, and multiple conductive sections 12b and 14b shaped like a rectangular and made of conductive resin. Conductive sections 12b and 14b respectively join light transmissive sections 12a together and 14a together. This structure is also similar to that of the first embodiment.

Since these multiple light transmissive sections 12a, 14a and conductive sections 12b, 14b are made of conductive resin, they can be manufactured with ease by the screen-printing method within a short time as discussed in the first embodiment. The details thereof are thus omitted here.

Multiple voids 12c shaped like generally a square are provided between respective lower electrodes 12, and voids 14c similar to voids 12c are provided between respective upper electrodes 14. Upper base sheet 13 is layered on lower base sheet 11 such that multiple voids 14c are layered above multiple light transmissive sections 12a respectively, and multiple light transmissive sections 14a are layered above multiple voids 12c respectively. Sheet 13 and sheet 11 are bonded together so that light transmissive sections 12a confront voids 14c and voids 12c confront light transmissive section 14a with a predetermined distance therebetween, i.e. the thickness of upper base sheet 13. This structure is also similar to that of the first embodiment. However, EL element 25 is bonded to underside 16a of touch panel 16 of movable contact unit 26 shown in FIG. 6 and in accordance with this second embodiment.

As shown in FIG. 6, EL element 25 includes the following elements:
  film-like light transparent substrate 25a;
  light transmissive electrode layer 25b, light emitting layer 25c, dielectric layer 25d, and back-electrode layer 25e layered sequentially by a printing method on an underside of substrate 25a; and
  insulating layer 25f made of epoxy or polyester resin and layered such that it covers the foregoing layers and substrate 25a by the printing method.

Light transmissive electrode layer 25b is made of light transmissive synthetic resin in which indium-tin oxide and the like is dispersed, or electrically conductive resin such as polyethylene-dioxythiophene. Light emitting layer 25c is made of synthetic resin, e.g. fluoro-rubber, in which phosphor such as zinc sulfide, which is a base material for light emission, is dispersed. Dielectric layer 25d is made of synthetic resin, e.g. fluoro-rubber, in which barium titante is dispersed. Back electrode layer 25e is made of resin in which silver or carbon is dispersed.

EL element 25 includes cover sheet 17 bonded on an underside of element 25, and cover sheet 17 includes domed movable contact 18 made of conductive thin metal sheet bonded on an underside of sheet 17. Separator 19 is bonded on the underside of sheet 17 for covering the entire underside of sheet 17. Movable contact unit 26 is thus constructed.

Figure 7:
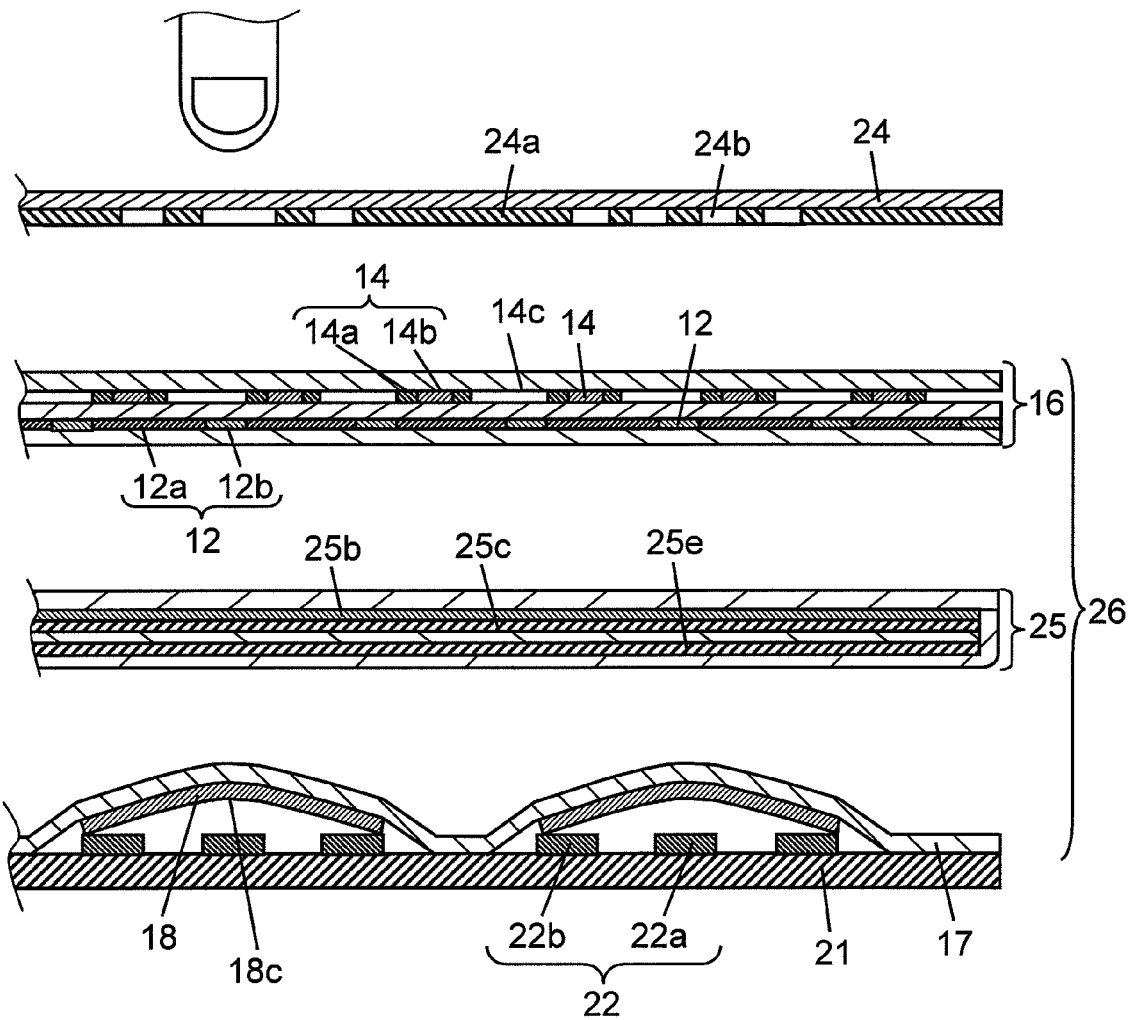
FIG. 7 shows an exploded sectional view of a switch employing the movable contact unit in accordance with the second embodiment of the present invention.

FIG. 7 shows an exploded sectional view of a switch, employing movable contact unit 26, in accordance with the second embodiment of the present invention. In FIG. 7, wired board 21 having multiple wiring patterns (not shown) formed on both its top face and underside is prepared. Substrate 21 is provided with multiple fixed contacts 22 on its top face. Each one of fixed contacts 22 is formed of center fixed contact 22a and outer fixed contact 22b. Movable contact unit 26 with separator 19 removed is bonded on the top face of wired board 21, so that multiple switch contacts are formed under touch panel 16. Light-proof section 24a is punched out to form letters and symbols, so that multiple display sections 24b are formed. Display sheet 24 having these multiple display sections 24b is placed on the top face of touch panel 16. The switch is thus constructed. The foregoing structure is similar to that demonstrated in the first embodiment.

This second embodiment employs EL element 25, placed between touch panel 16 and cover sheet 17, instead of multiple light emitting elements 23 demonstrated in the first embodiment and mounted on the top face of wired board 21. The switch in accordance with the second embodiment thus employs EL element 25 working as the light emitting bodies placed on the entire underside of touch panel 16.

The switch thus constructed is mounted on an operating board of an electronic device, and lower electrodes 12 as well as upper electrodes 14 of touch panel 16, and light transmissive electrode layer 25b as well as back electrode layer 25e of EL element 25, and fixed contacts 22 are connected to the electronic circuit (not shown) of the electronic device via the wiring patterns and lead wires (not shown).

The electronic circuit applies a voltage to lower electrodes 12 and upper electrodes 14 of the foregoing structure sequentially, and a user lightly touches a finger to the top face of display sheet 24 for operating the electronic device. Then parts of electric charges of touch panel 16 travel to the finger, thereby changing the capacitance of respective lower and upper electrodes 12 and 14 of the touched and operated place. The electronic circuit thus can detect which part of display sheet 24 is touched and operated. This mechanism is similar to that demonstrated in the first embodiment.

A depression onto a predetermined display section 24b of display sheet 24 prompts touch panel 16 and EL element 25 to bow, which presses the center of domed movable contact 18, which is resiliently reversed inside-out, and underside center 18c of contact 18 touches center fixed contact 22a. This action allows electrically connecting center fixed contact 22a to outer fixed contact 22b via movable contact 18, so that the electronic circuit can detect which display section 24b is depressed and operated. This mechanism is also similar to that demonstrated in the first embodiment.

In response to the foregoing touch or depression, the device can switch its variety of functions, and allows its electronic circuit to supply power to light transmissive electrode layer 25b and back electrode layer 25e of EL element 25. Then light emitting layer 25c emits light, which travels through touch panel 16 and illuminates multiple display sections 24b from below. EL element 25 emits the light from its entire top face, and illuminates multiple display sections 24b of sheet 24 from below.

To be more specific, the entire top face of EL element 25 emits the light, which travels through touch panel 16 at almost all the places, where light transmissive sections 12a are overlaid by voids 14c as well as voids 12c are overlaid by light transmissive sections 14a, but does not travel through the places where conductive sections 12b are overlaid by conductive sections 14b, thereby illuminating multiple display sections 24b from just below. This structure allows the user to read the letters and symbols of display sections 24b in the condition of high brightness and excellent visibility, so that the user can operate the device with ease.

In other words, the entire surface of one single EL element 25 emits the light, thereby illuminating all the display sections 24b. Thus it is not needed to mount multiple light emitting elements 23 onto the top face of wired board 21, so that the number of components associated with the light emitting body such as element 23 can be greatly reduced. The switch in accordance with this second embodiment can be manufactured at a lower cost, and since this switch can use more efficiently the light emitted from the light emitting bodies, the device can work with smaller power consumption.

Light transmissive layer 25b, back electrode layer 25e, and light emitting layer 25c are not placed on the entire surface of EL element 25, but they can be placed locally, i.e. just below each one of display sections 24b. This placement allows maintaining the illumination of high brightness, and yet EL element 25 can be manufactured at a lower cost because of the local formation of the foregoing layers.

Similar to the first embodiment, this second embodiment allows obtaining touch panel 16 to be manufactured in a simple method at a lower cost. On top of that, movable contact unit 26 formed of EL element 25 and multiple movable contacts 18 is provided to underside 16a of touch panel 16. This structure allows illuminating multiple display sections 24b from just below display sections 24b, so that movable contact unit 26 of excellent visibility and operability is obtainable and the switch employing this movable contact unit is achievable.

The foregoing discussion refers to touch panel 16 in which belt-like multiple lower electrodes 12 are formed on a top face of lower base sheet 11, and belt-like multiple upper electrodes 14 are formed on a top face of upper base sheet 13. Base sheet 13 is layered on lower base sheet 11 such that upper electrodes 12 away from lower electrodes 14 with a predetermined distance and electrodes 12 cross with electrodes 14 at right angles. However, these lower and upper electrodes 12 and 14 can be printed on one base sheet such that electrodes 14 are overlaid on electrodes 12.

Figure 8:
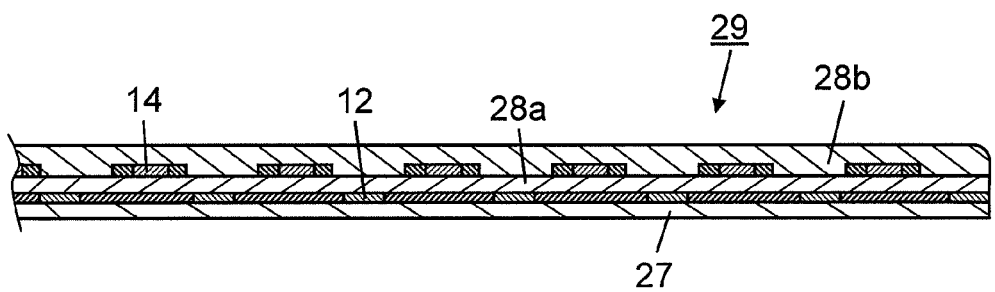
FIG. 8 shows a sectional view of a touch panel to be employed to the movable contact unit in accordance with the second embodiment of the present invention.

FIG. 8 shows a sectional view of touch panel 29 to be employed in a movable contact unit in accordance with the second embodiment. As shown in FIG. 8, lower electrodes 12 and upper electrodes 14 are printed on one single base sheet 27 such that electrodes 14 are overlaid on electrodes 12 thereby forming touch panel 29. A manufacturing process of touch panel 29 is demonstrated hereinafter.

In FIG. 8, multiple belt-like lower electrodes 12 are firstly formed by a screen-printing method on a top face of film-like light transparent base sheet 27 before they are dried. Then light transmissive lower insulating layer 28a made of epoxy or polyester resin is formed to cover lower electrodes 12. Multiple upper electrodes 14 are formed on a top face of insulating layer 28a in a direction crossing with lower electrodes 12 at right angles. Light transmissive upper insulating layer 28b is formed on a top face of lower insulating layer 28a such that it covers upper electrodes 14. These layers are sequentially formed by printing.

Electrodes 12 are placed away from electrodes 14 with a predetermined distance, and thus touch panel 29 shown in FIG. 8 is completed. This structure needs only one base sheet 27, and eliminates protective sheet 15, so that the number of components associated with the sheets can be greatly reduced. As a result, touch panel 29 can be manufactured in a further simpler way at a lower cost.

Figure 9A:
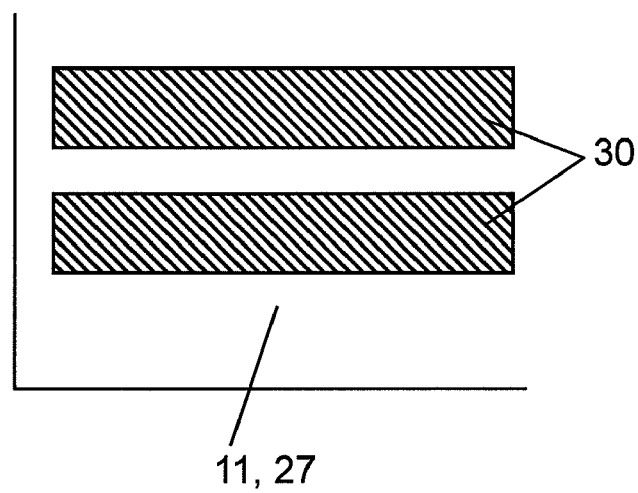
FIG. 9A shows a partial plan view of a touch panel in accordance with the second embodiment of the present invention.
Figure 9B:
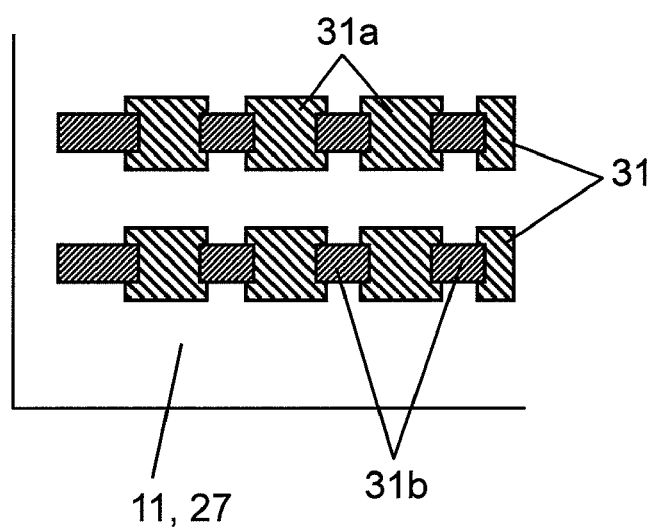
FIG. 9B shows another partial plan view of a touch panel in accordance with the second embodiment of the present invention.
Figure 10:
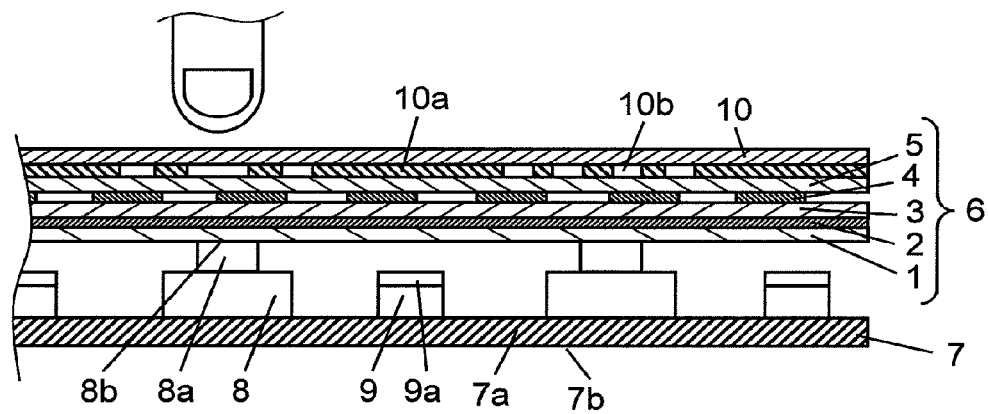
FIG. 10 shows a sectional view of a conventional switch.
Figure 11:
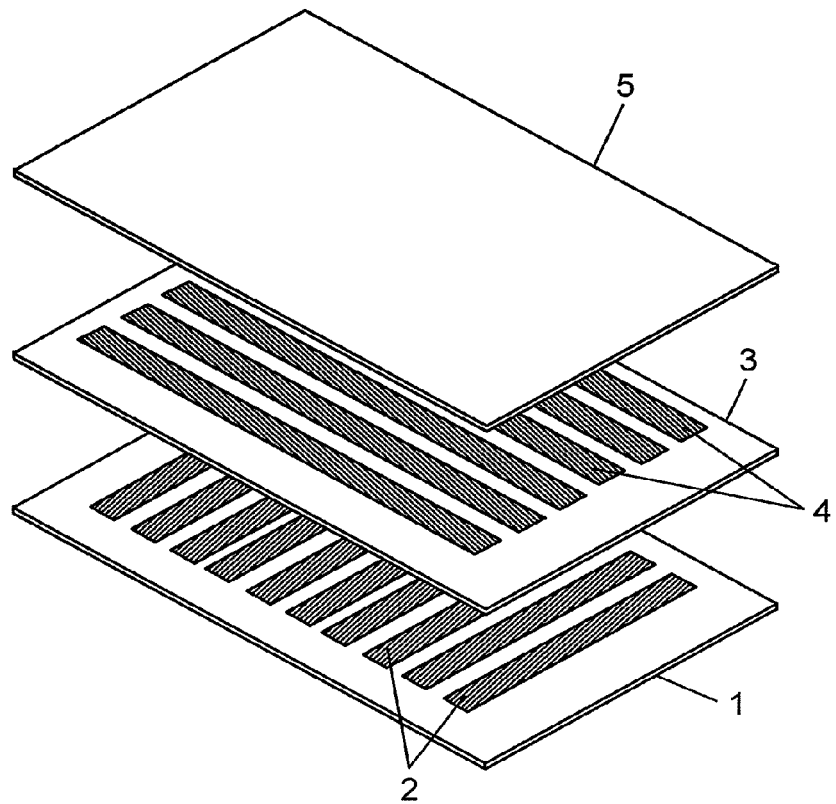
FIG. 11 shows an exploded perspective view of a conventional touch panel.

FIGS. 9A and 9B show partial plan view in parts of a touch panel in accordance with the second embodiment of the present invention.

The foregoing discussion of the second embodiment refers to the structure where lower electrodes 12 and upper electrodes 14 of touch panel 16 are formed of multiple light transmissive sections 12a and 14a shaped like a square joined together respectively by conductive sections 12b and 14b shaped like a rectangle. However, as shown in FIG. 9A, by using the light-transmissive and conductive resin material, multiple belt-like lower electrodes 30 or upper electrodes (not shown) can be formed on base sheet 11 or 27 with other structures remaining the same as discussed previously. This structure can be also in accordance with the second embodiment. In a similar way, as shown in FIG. 9B, multiple light transmissive sections 31a shaped like a rectangle are joined together into a belt-like shape by multiple conductive sections 31b on a top face of base sheet 11 or 27, thereby forming belt-like lower electrodes 31 or upper electrodes (not shown). Other structures remain the same as previously discussed. The foregoing structure can be also in accordance with the second embodiment. Those electrodes, light transmissive sections, and conductive sections discussed above allow detecting the touched and operated place through a change in capacitance.

The touch panels as well as the movable contact units and the switches employing the touch panels discussed previously may be detected their touched and operated places through a change in the capacitance. In other words, the foregoing discussion refers to the detection of the touched and operated place through a change in capacitance of respective electrodes; however, the structure of those components may be this: The touched and operated place is detected through a change in capacitance between the electrodes. To be more specific, a pattern of the electrodes may be another one than those shown in FIGS. 9A and 9B insofar as the structure includes multiple belt-like lower electrodes, and multiple belt-like upper electrodes spaced away from the lower electrodes with a predetermined distance therebetween and formed in a direction crossing with the lower electrodes at right angles, and at least a part of the electrodes is made of light transmissive conductive resin.

On top of that, the foregoing demonstration refers to the structure where touch panel 16 or EL element 25 has cover sheet 17 bonded to its underside, and cover sheet 17 includes domed multiple movable contacts 18 made of conductive thin metal sheet bonded to its underside, whereby movable contact unit 20 or 26 is formed. However, cover sheet 17 can be eliminated, and multiple movable contacts 18 can be directly bonded to the underside of touch panel 16 or EL element 25. This structure allows forming the movable contact unit at a further lower cost.

The foregoing lower and upper electrodes can be formed of multiple light transmissive sections joined together by the multiple conductive sections, which can be made of silver or carbon. Use of this material to the conductive sections allows the lower and upper electrodes to have a smaller resistance, so that stable as well as reliable operation can be expected.

The touch panel, and the movable contact unit as well as the switch employing the same touch panel can be manufactured advantageously in a simple way at a low cost, and assure reliable operation, so that they are useful for operating a variety of electronic devices.

What is claimed is:

1. A touch panel comprising:
   a light transparent base sheet;
   a plurality of belt-shaped lower electrodes disposed on a top face of the base sheet; and
   a plurality of belt-shaped upper electrodes disposed above the plurality of belt-shaped lower electrodes with a predetermined distance therebetween and in a direction crossing with the plurality of belt-shaped lower electrodes at right angles,
   wherein the plurality of lower electrodes are formed of (i) a plurality of first light transmissive sections made of a light transmissive and electrically conductive resin and (ii) a plurality of first conductive sections having a lower resistance than the plurality of first light transmissive sections, the plurality of first conductive sections being disposed between the plurality of first light transmissive sections and coupling the plurality of first light transmissive sections to each other,
   wherein the plurality of belt-shaped upper electrodes are formed of (i) a plurality of second light transmissive sections made of the light transmissive and electrically conductive resin and (ii) a plurality of second conductive sections having a lower resistance than the plurality of second light transmissive sections, the plurality of second conductive sections being disposed between the plurality of second light transmissive sections and coupling the plurality of second light transmissive sections to each other, and
   wherein the plurality of first conductive sections and the plurality of second conductive sections include at least one of silver and carbon.

2. The touch panel of claim 1, wherein the light transmissive and electrically conductive resin is one of polythiophene and polyaniline.

3. The touch panel according to claim 1, wherein a sheet resistance of the plurality of first light transmissive sections and the plurality of second light transmissive sections is (i) greater than or equal to 500Ω/□ and (ii) less than or equal to 1.5Ω/□, and a sheet resistance of the plurality of first conductive sections and the plurality of second conductive sections is (i) greater than or equal to 10Ω/□ and (ii) less than or equal to 300 Ω/□.

4. A movable contact unit comprising:
   a touch panel including
      a light transparent base sheet,
      a plurality of belt-shaped lower electrodes disposed on a top face of the base sheet, and
      a plurality of belt-shaped upper electrodes disposed above the plurality of belt-shaped lower electrodes with a predetermined distance therebetween and in a direction crossing with the plurality of belt-shaped lower electrodes at right angles; and
   a domed movable contact made of an electrically conductive metal thin sheet and mounted on an underside of the touch panel, wherein the plurality of belt-shaped lower electrodes are formed of (i) a plurality of first light transmissive sections made of a light transmissive and electrically conductive resin and (ii) a plurality of first conductive sections having a lower resistance than the plurality of first light transmissive sections, the plurality of first conductive sections being disposed between the plurality of first light transmissive sections and coupling the plurality of first light transmissive sections to each other, wherein the plurality of belt-shaped upper electrodes are formed of (i) a plurality of second light transmissive sections made of the light transmissive and electrically conductive resin and (ii) a plurality of second conductive sections having a lower resistance than the plurality of second light transmissive sections, the plurality of second conductive sections being disposed between the plurality of second light transmissive sections and coupling the plurality of second light transmissive sections to each other, and wherein the plurality of first conductive sections and the plurality of second conductive sections include at least one of silver and carbon.

5. The movable contact unit of claim 4, wherein the light transmissive and electrically conductive resin is one of polythiophene and polyaniline.

6. The movable contact unit according to claim 4, wherein a sheet resistance of the plurality of first light transmissive sections and the plurality of second light transmissive sections is (i) greater than or equal to 500Ω/□ and (ii) less than or equal to 1.5 kΩ/□, and a sheet resistance of the plurality of first conductive sections and the plurality of second conductive sections is (i) greater than or equal to 10Ω/□ and (ii) less than or equal to 300Ω/□.

7. A switch comprising:
a touch panel including
a light transparent base sheet,
a plurality of belt-shaped lower electrodes disposed on a top face of the base sheet, and
a plurality of belt-shaped upper electrodes disposed above the plurality of belt-shaped lower electrodes with a predetermined distance therebetween and in a direction crossing with the plurality of belt-shaped lower electrodes at right angles; and
a plurality of switch contacts and light emitting bodies disposed on an underside of the touch panel, wherein the plurality of belt-shaped lower electrodes are formed of (i) a plurality of first light transmissive sections made of a light transmissive and electrically conductive resin and (ii) a plurality of first conductive sections having a lower resistance than the plurality of first light transmissive sections, the plurality of first conductive sections being disposed between the plurality of first light transmissive sections and coupling the plurality of first light transmissive sections to each other, wherein the plurality of belt-shaped upper electrodes are formed of (i) a plurality of second light transmissive sections made of the light transmissive and electrically conductive resin and (ii) a plurality of second conductive sections having a lower resistance than the plurality of second light transmissive sections, the plurality of second conductive sections being disposed between the plurality of second light transmissive sections and coupling the plurality of second light transmissive sections to each other, and wherein the plurality of first conductive sections and the plurality of second conductive sections include at least one of silver and carbon.

8. The switch of claim 7, wherein the light transmissive and electrically conductive resin is one of polythiophene and polyaniline.

9. The switch according to claim 7, wherein a sheet resistance of the plurality of first light transmissive sections and the plurality of second light transmissive sections is (i) greater than or equal to 500Ω/□ and (ii) less than or equal to 1.5 kΩ/□, and a sheet resistance of the plurality of first conductive sections and the plurality of second conductive sections is (i) greater than or equal to 10Ω/□ and (ii) less than or equal to 300 Ω/□.

* * * * *